April 13, 1971     W. P. SIEGMUND ETAL     3,574,582
METHOD FOR MAKING FIBER OPTICAL IMAGE-CONDUCTING DEVICES
EMBODYING STRAY LIGHT-ABSORBING MEANS
Original Filed May 17, 1965
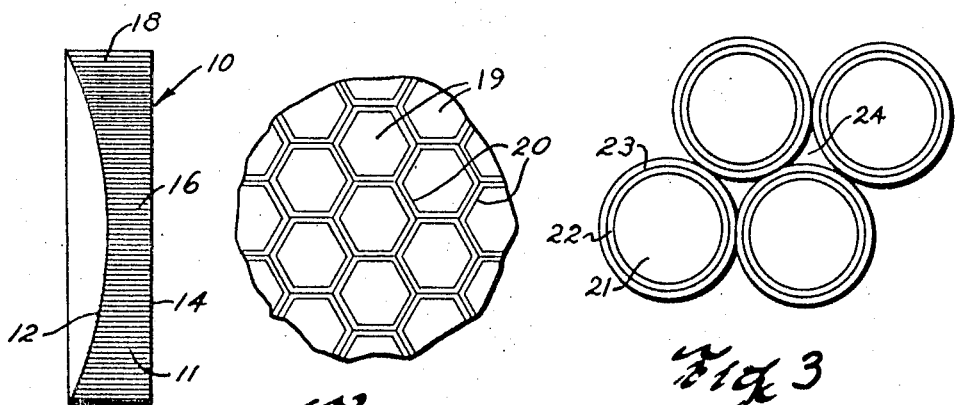
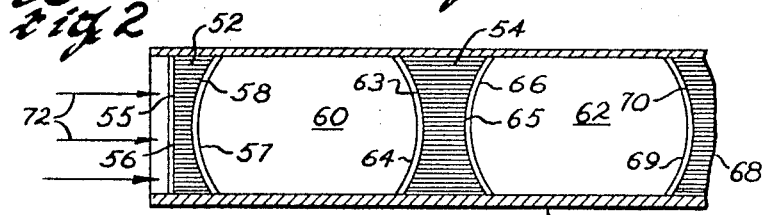
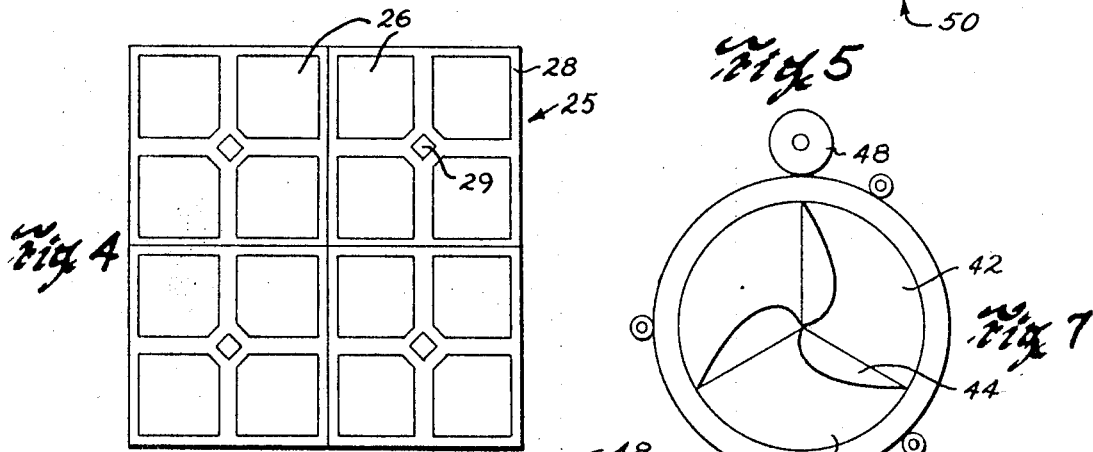
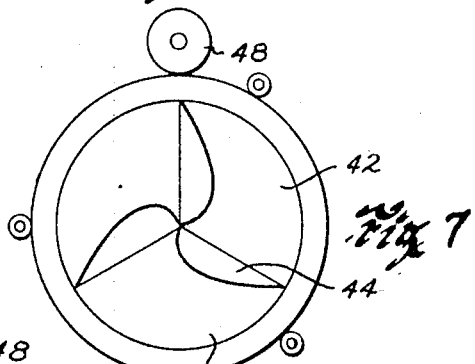
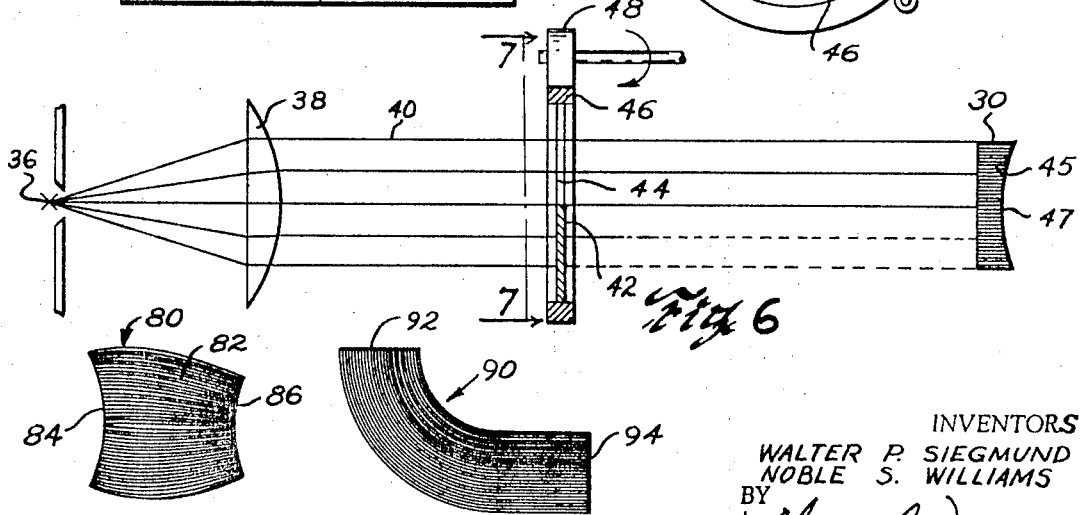
INVENTORS
WALTER P. SIEGMUND
NOBLE S. WILLIAMS
BY
William C. Nolan
ATTORNEY

3,574,582
METHOD FOR MAKING FIBER OPTICAL IMAGE-CONDUCTING DEVICES EMBODYING STRAY LIGHT-ABSORBING MEANS

Walter P. Siegmund, Woodstock, Conn., and Noble S. Williams, Sturbridge, Mass., assignors to American Optical Corporation, Southbridge, Mass.
Original application May 17, 1965, Ser. No. 456,249, now Patent No. 3,436,142, dated Apr. 1, 1969. Divided and this application Oct. 4, 1968, Ser. No. 765,234
Int. Cl. C03b *37/00, 11/08, 19/00*
U.S. Cl. 65—4                                    2 Claims

ABSTRACT OF THE DISCLOSURE

Method of making fiber optical image-conducting devices each of different thicknesses in different parts considered in the longitudinal direction thereof, and including thin elongated light-absorbing means dispersed and uniformly spaced throughout the cross-sectional area of the fiber optical device and extending longitudinally from end-to-end thereof, said method being such as to form absorbing means of such varying controlled stray light characteristics as to provide uniform transmission of optical energy through all parts of the image-conducting device formed thereby.

---

This application is a division of application Ser. No. 456,249, which was filed May 17, 1965 and which issued Apr. 1, 1969 as U.S. Pat. No. 3,436,142.

This invention relates to fiber optical image-conducting devices and the like of non-uniform thicknesses and having "built-in" stray light-absorbing means of such a character as to insure like optical image transmission through all parts thereof.

More particularly, the invention relates to improved fiber optical projection screens, face plates, image transfer bundles, and the like formed of many light-conducting fiber optical components and having non-uniform thicknesses in various parts of the improved devices (considered between their respective entrance and exit faces) and also having stray light-absorbing means of varying character contained in and dispersed throughout said devices in such a manner that overall uniform transmission of optical images will be provided by said devices. The invention also includes a method of manufacture of such improved devices.

Fiber optical image-conducting screens and the like formed by many transparent fiber cores coated with and separated from one another by transparent material of a lower refractive index are known and, furthermore, stray light absorption in such screens and the like, provided by absorbing ingredients contained within the lower index coatings have also been provided heretofore for improving the performance of such screens. In this respect, attention is direction to U.S. Pats. Nos. 2,825,260 and 3,060,789.

It has been found, however, that when such stray light-absorbing image-conducting plates, screens and the like of earlier construction, and which had generally parallel front and rear faces and were thus of uniform thicknesses, were altered as by grinding and polishing, so as to have one, or both of their opposite end faces shaped or curved to serve as field flatteners or the like, they did not perform satisfactorily. They did not provide, in the manner desired, like optical image-transmission through all parts of the devices.

It is often desirable for various reasons, however, to provide fiber optical screens, face plates and the like devices of the stray light-absorbing type with non-uniform thicknesses in various parts of the devices. One example would be a fiber optical image field flattener having one concave surface and one plano surface for use with a photographic lens system or the like. Another example would be an inter-stage coupling plate for electronic image intensifiers wherein fiber optical screens having opposed plano and concave faces or a pair of bi-concave faces might be employed.

If stray light-absorbing means such as used heretofore is incorporated into such a fiber optical plate of non-uniform thickness, unsatisfactory results will be obtained since different amounts of stray light absorption will be provided in different parts of the optical image transmitted thereby. Likewise, if it is attempted, in the manner used heretofore, to provide stray light absorption in a rigid fiber optical bundle which has been bent so as to have its entrance and exit surfaces disposed in non-parallel relation to each other and different fibers of the bundle of differing lengths, a transmitted image of unsatisfactory non-uniform character will most likely result.

A reason for such undesirable conditions in the optical image transmitted by such a fiber optical screen, or the like, having different thicknesses in different parts thereof is due, to a large degree, to the fact that the specific absorption per unit of length of the coating or other absorbing means being employed is the same in all parts of the device, while, on the other hand, the longitudinal distances along individual fiber optical components in one part of such a device may be materially different from that along other fiber optical components in a different part of the device. Accordingly, the total amount of stray light absorption provided in one part of the optical device may be appreciably greater than that provided in another part thereof and may affect the appearance of any image transmitted thereby.

When it was attempted to provide, for such fiber optical device of non-uniform thicknesses, different amounts of specific absorption for different components, considered, for example, from the center to the outer edges of a plano-concave field flattener, so as to obtain an overall uniformity in the transmitted optical image, such procedure was found to be highly impractical. This was particularly so when a very large number of fiber optical components were employed for obtaining high resolution in the transmitted image.

Furthermore, when it was attempted instead to provide different amounts of specific absorption in several successive concentric zones of fiber optical components, the results likewise were not satisfactory since these different zones, when a practical number (such as 4, 6, 8 or 10, for example), were used, resulted in visibly different areas in the image transmitted thereby.

It has now been found that by following the teachings of the present invention, improved fiber optical image-transmitting or image-conducting screens, face plates, bundles and like devices of the type having non-uniform thicknesses in different parts thereof (considered longitudinally along the different fiber optical components and between the entrance and exit faces of the device) can be provided with means for obtaining different controlled amounts of stray light absorption in different parts of the devices in such a manner that uniform stray light absorption conditions will be accomplished in all parts of transmitted images at the exit face of such devices. In fact, the accomplishing of this uniform stray light absorption and this improved transmission also is readily possible even though the configurations and stray light absorption requirements for different fiber optical devices of non-uniform thicknesses may vary considerably relative to one another.

When proper means are employed and proper steps are taken for carrying out the present invention, it is possible to produce in a practical and economical manner stray light-absorbing fiber optical image-conducting devices formed of glass and having different corresponding parts of their respective entrance and exit faces disposed at variations different distances from each other and possible to provide built-in light-absorbing means of such different controlled amounts of absorption in different parts thereof that said improved devices will provide like optical image transmission conditions throughout all parts thereof.

Not only is it possible, in one modified form of the invention, to provide absorption means of such varying controlled amounts of light absorption within the lower index single claddings of components employed for forming fiber optical devices of the character described, but also possible in a different modified form of the invention to provide, instead, absorption means of varying controlled amounts of light absorption within the second claddings of double-clad light-conducting components intended for use in forming improved fiber optical devices. Likewise, it is possible, in a third modified form of the invention, to provide the overall uniform stray light absorption desired by use of thin elongated absorbing fibers, having varying controlled amounts of stray light absorption contained therein, dispersed within multifiber types of light-conducting components being used for forming the improved devices of the present invention.

Such "built-in" stray light absorption, providing varying controlled amounts of light absorption within different parts of the formed fiber optical plate or like device, is accomplished by the proper use and treatment of photosensitive glass of preselected type either as the first coating in one modified form of the invention, or as the second coating in another modified form of the invention, or even as separate spaced absorbing fibers in a third modified form of the invention; all as will be more fully explained hereinafter.

The invention also includes a method by which such improved fiber optical devices of varying thicknesses in different parts thereof are, nevertheless, provided with controlled stray light absorption characteristics of such kind that uniform image transmission conditions will be provided through all parts of the improved devices.

Other objects and advantages of the invention will become apparent from the detailed description which follows when considered in conjunction with the accompanying drawings in which:

FIG. 1 is a central longitudinal sectional view of one form of fiber optical device embodying the present invention;

FIGS. 2 and 3 are enlarged transverse fragmentary views showing two different forms of light-transmitting components which may be used in devices embodying the present invention;

FIG. 4 is a somewhat similar view but showing a multifiber type of light-conducting components which may be employed in devices embodying the invention;

FIG. 5 is a partial longitudinal sectional view showing part of a multi-stage optical image intensifier employing improved fiber optical devices of the present invention;

FIG. 6 is a longitudinal sectional view showing a mechanical-optical arrangement which may be used in carrying out method steps of the present invention;

FIG. 6 is a sectional view taken substantially upon section 7—7 of FIG. 6 and looking in the direction of the arrows;

FIG. 8 is a side elevational sectional view of a modified form of fiber optical device embodying the invention; and FIG. 9 is a side elevational view showing a different modified form of fiber optical device embodying the present invention.

Referring to the drawings in detail and in particular FIG. 1, wherein a transverse sectional view of an optical image field flattener type of fiber optical device embodying the invention is indicated at 10, it will be noted that this device is provided with a concave surface 12 on its front face and a plano surface 14 on its rear face. This device comprises a very large number of thin elongated fiber optical components 11 disposed in side-by-side generally parallel relation to each other. Accordingly, fiber optical components 16 near the center of this device will have a materially lesser length than those indicated at 18 nearer the outer periphery of the device.

It will be appreciated, of course, that when such an improved device is intended to provide a high degree of resolution in images transmitted thereby, it will be formed by a very large number of individual fiber optical components having light-conducting cores of glass optically insulated from adjacent cores by surrounding coatings or claddings of glass of a lower refractive index which serve to contain much of the longitudinally travelling light rays within the core. In FIG. 2 is shown a fragmentary frontal view of a part of such a plate-like device employing one modified form of components which may be used, and in this modification each fiber optical component comprises transparent glass core of a given index indicated at 19 surrounded by a cladding glass 20 of relatively lower refractive index. In this figure, the cladding glass between adjacent cores has been shown as it would appear after being integrally fused together.

However, when it was attempted, heretofore, to provide a flat fiber optical face plate having stray light absorption characteristics effected by the cladding material thereof with a concave surface adapted to fit, for example the predetermined curvature of field of particular lens system (not shown), it was found that the image transmitted thereby did not have the same transmission qualities in all parts thereof. It was found, instead, that because of the differences in lengths of the fiber optical components near the center in comparison to those nearer the outer edge of the plate, the transmission efficiencies were different. The transmission became poorer nearer the outer edges. It will be appeciated, of course, that the claddings for all of the components of this plate had the same specific absorptions (absorption per unit volume of material employed), and greater amounts of absorption of stray light from the cores which managed to enter the claddings were experienced near the outer edges of the transmitted image than near the center.

Even though it might be felt that such a non-uniform image transmission condition might be avoided if a different correct amount of specific absorption were provided in the cladding material of each different fiber optical component, considered in all directions progressively outwardly from the center to the periphery of such a concave field flattener, for example, the making of such a fiber optical device in this manner would be extremely difficult, time-consuming, expensive and highly impractical; especially when high image resolution is desired and the device is to have any appreciable exposed frontal area.

Even if it were attempted, instead, to form such a stray light-absorbing fiber optical screen or the like of nonuniform thickness by use of a reasonable number of concentric zones of like components and with the components of each zone provided with a different controlled amount of specific absorption in the cladding material being employed, the results still would not be entirely satisfactory. These different zones may very well be distinguishable and thus objectionable in the transmitted image.

It is now proposed, in the manufacture of such a fiber optical image-conducting device of non-uniform thicknesses and intended to care for stray light absorption in a uniform manner, to form each individual light-conducting component, whether of a single clad component type, or of a double clad component type, or even of a multifiber component type, of especially selected glasses, assemble and form same into a plate-like structure or a bundle of components of the size and shape desired and thereafter subject the structure to a carefully controlled irradiation treatment followed by a heat-treating process to thereby produce the improved device desired.

Thus, in the modified form of fiber optical device suggested in FIG. 2 for forming a face plate or the like, individual light-conducting components formed by light-transmitting cores 19 of relatively high refractive index glass surrounded by a single coating 20 of glass of a relatively lower refractive index are shown assembled together in side-by-side relation to each other. Thereafter, they would be subjected to a bonding or fusing operation to form same into a unitary finished face plate. However, not only is the glass of these coatings 20 of a lower refractive index than that of the cores 19 but also it is of an especially selected photosensitive type such as a glass made in accordance with the teachings of any one of the eight Stookey patents referred to in the last paragraph of this specification.

In a modified form of construction as shown in FIG. 3, instead of using single coated components, double coated components are suggested; each having a high refractive index light-transmitting core 21 of glass upon which have been formed a first coating 22 of clear glass of a relatively lower refractive index and then a second coating 23 of a glass of an epecially selected photosensitive type as suggested above. Preferably, this second coating would be selected so as to have a refractive index equal to or slightly higher than that of the first coating for reasons which will appear hereinafter. In this construction, the coating 23 may be fused or bonded together or another glass of suitable lower melting characteristics may be used, as indicated at 24, for bonding or fusing the components rigidly in place in side-by-side generally parallel relation.

A third form of construction using fiber optical components of a different type is suggested in FIG. 4. In this construction, each component is a preformed multifiber, generally indicated at 25, and comprises a plurality of fiber cores 26 of relatively high refractive index transparent glass surrounded and separated from one another by a lower refactive index glass 28 in fused relation thereto. Preformed multifiber light-conducting components are known and while each component 25, as shown in FIG. 4, comprises a group of only four individual light-conducting cores 26, various other convenient groupings of cores, such as 9, 16 or 25 might as readily be employed. In each of the improved multifiber components 25, of the instant disclosure, however, is contained a centrally located elongated fiber element 29 and this fiber element 29 is formed of a glass of an especially selected photosensitive type as suggested above.

After a sufficient number of components selected from any one of these different constructions have been assembled together in side-by-side generally parallel relation to form a fiber optical bundle or plate-like arrangement of desired size, the assembly will be subjected to heat treatment so as to fuse or bond the assembled parts together and effect a rigid structure. Such a structure can be arranged and processed so as to produce an air-tight construction by known techniques, if desired. However, in some instances, an air-tight device will not be required.

After this fusing or bonding step, the resulting rigid fiber optical device will be subjected to known grinding and polishing operations, or the like, as desired to form upon the opposite faces of the device entrance and exit surfaces of plane or curved shape and surface quality desired. Thereafter, different parts of the structure will be subjected to various different amounts of ultra-violet radiation, in a carefully controlled manner presently to be described, and then the structure will be heat-treated in known manner to develop out various different amounts of opacity in the photosensitive glass in different parts of the finished device. When the method has been properly carried out, the varying amounts of light absorption in the various differently located components of the device will be such as to just compensate for the differences in length of components in different parts of the finished fiber optical device.

In FIG. 6, there is shown a mechanical-optical arrangement having various different thicknesses in different parts thereof, such as indicated at 30, may be variously exposed to different predetermined amounts of ultra-violet radiation. In this mechanical-optical arrangement, there is provided at 36 a source of ultra-violet radiation and a part of this radiation is collected by an ultra-violet transmitting condenser lens element 38, or the like, and directed as a generally parallel beam 40 toward the fiber optical device 30 to be processed. (A parabolic mirror for forming such a parallel beam of ultra-violet light might be preferred instead.)

The fiber optical device 30, it will be appreciated, has a greater thickness at its edges than at its center. Also, it will be appreciated that the fiber optical components thereof comprise photosensitive glass. Therefore, disposed in beam 40 between the condenser lens 38 and the fiber optical device 30 is an opaque rotatable diaphragm 42 which, as better shown in FIG. 7, is provided with a clear aperture or apertures 44 of predetermined controlled size and shape. These apertures are arranged so that, during an exposure of predetermined length of the device 30 to the ultra-violet beam 40, the longer fiber optical components 45 nearer the outer edge portions of device 30 will be subjected to comparatively small amounts of ultra-violet radiation while the fiber optical components 47 nearer the center will be exposed to larger amounts of this energy.

Notwithstanding the fact that different small parts of the individual aperture, or apertures 44, considered progressively outwardly from the center of the diaphragm to its outer edge, and taken together with the rotational movement of the diaphragm 42, have been proportioned (contoured) so as to transmit controlled greater amounts of ultra-violet radiation near the center of device 30 than near the outer edge, it should be appreciated that various other different sizes of apertures and differently shaped apertures may be employed, as found desirable, for other fiber optical devices of different shapes and types. A ring for rotatably supporting diaphragm 42 is indicated at 46 and a small driving wheel 48 is shown in peripheral frictional contact therewith.

It would be possible to employ other radiation controlling means for exposing device 30 than the rotating type of opaque diaphragm and clear aperture structure suggested in FIG. 6. For example, a photographically produced filter of properly varying center-to-edge transmission characteristics formed upon a clear ultra-violet transmitting film might be positioned in the beam of ultra-violet radiation and used to provide the correct different amounts of optical energy required for different parts of the component being irradiated. Equivalent ultra-violet irradiation control means might be obtained by the use of vacuum coating techniques wherein a tapered wedge-like layer of metal of controlled varying thicknesses, considered in all radial directions from the center of the layer may be deposited upon a clear plate of ultra-violet transmitting material and later interposed in the beam 40 between the source and the fiber optical device 30. A radially expandable iris diaphragm might also be used and suitably controlled during each exposure.

In FIG. 5 is shown diagrammatically a portion of a multi-stage electronic tube type image intensifier 50. In this figure, not only is a plano-concave fiber optical screen or plate 52 employed at the entrance end 53 of the intensifier but a different form of fiber optical plate is shown at 54 intermediate the ends of the intensifier. The plate 52 has a fluorescent coating 55 applied to its flat outer face 56 and has a photo-sensitive electron-emissive cathode coating 57 disposed upon its spherically curved concave inner face 58.

The intensifier may comprise a number of intensifier cells or units disposed serially, as suggested by numerals 60 and 62 in a cascade arrangement, and the fiber optical plate-like device 54 is shown located between two of these cells. Device 54 is of bi-concave type and is arranged to ment whereby fiber optical image-conducting devices having carry upon its forward or entrance face 63 a layer of fluorescent material 64 and upon its rear or exit face 65 a photosensitive electron-emissive layer 66. The plate-like fiber optical device 68 carrying fluorescent layer 69 on its concave forward or entrance face 70 may be an interior partition between cells, or it may form the exit end wall of the image intensifier. In any event, at least the opposite end walls of the intensifier will be made air-tight. The electronic components which would be employed in such an image intensifier for providing the inter-electrode potential needed therefor are well known and, accordingly, have not been shown in FIG. 5. The entering light rays for forming an optical image to be intensified are indicated by arrows 72.

While concave spherical surfaces and flat surfaces have been indicated upon plate-like fiber optical devices 10, 52 and 54, it will be appreciated that other entrance and exit surface shapes, such as convex, non-spherical and even surfaces not at right angles to the direction of the components might be employed upon devices embodying the invention. In FIG. 8, is indicated a side elevational view of an optical image minifier 80 which has its fiber optical components 82 of different lengths and tapering cross-sections, and in FIG. 9, is shown a bent optical bundle 90 of bent shape so as to have its plane entrance and exit faces 92 and 94 facing in different directions and thus its fiber optical components of different lengths. Of course, such a device as at 80 could also be used as a magnifier. Accordingly, fiber optical components of such bundle may differ appreciably in length, but, nevertheless, the invention is such that by suitable choice of diaphragm means for use in an arrangement more or less like that suggested in FIG. 6, it is possible to expose all of the fiber optical devices mentioned above (and employing the photosensitive glass as the first coating, or as the second or overcoating, or even as interspersed fibers in multifiber component) to the correct amounts of ultra-violet radiation for the various fiber optical components thereof, and thus obtain overall uniform stray light-absorption conditions in the finished optical image transmitting devices being produced. Of course, in the device shown in FIG. 9 and others wherein axial symmetry is not present, a controlled linear movement of an opaque diaphragm across the beam 40 from the short component side to the long component side would be needed to just compensate for the differences in thicknesses in different parts of such devices.

Photosensitive glasses of different types and which might be used are known and some of these glasses are disclosed together with their methods of treatment in United States Stookey Pats. Nos. 2,515,936 through 2,515,943.

Having described our invention, we claim:

1. The method of making an image-conducting fiber optical device comprising forming by a heating and drawing operation a relatively large number of similar thin elongated fiber optical components each comprising a light-conducting core of glass having a known refractive index surrounded by at least one cladding of glass of a photosensitive type having a relatively lower known refractive index, positioning a sufficient number of said thin elongated components in side-by-side generally parallel relation to each other so as to form a coherent fiber bundle of desired transverse dimensions having said components arranged in like geometric array at the opposite ends thereof, heating said bundle at a temperature and for a time sufficient to cause said components to fuse together and form a rigid structure, subjecting said structure to optical grinding and finishing operations so as to form finished light-transmitting entrance and exit faces of predetermined shapes in optical alignment and in predetermined spaced relation to each other at the opposite ends of said structure and with certain of said components differing in length from the shortest components of said structure by known amounts, directing a beam of ultra-violet radiation substantially longitudinally into the ends of each of the components forming one of said finished end faces for a time sufficient to expose the photosensitive glass of the shortest components of said structure to radiation sufficient to effect the amount of opacity desired therein when subsequently heat-treated, and simultaneously differently controlling the amounts of ultra-violet radiation impinging upon each of the longer components of said structure so as to subject same to lesser amounts of radiation in direct proportion to the greater lengths thereof, and thereafter heating said structure at a predetermined temperature and for a time sufficient to develop the different amounts of opacity in the photosensitive glass in the different parts of said structure, whereby a fiber optical device of varying thickness and which provides substantially the same stray light-absorbing characteristics throughout all parts of said device for optical images being transmitted therethrough will be provided.

2. The method as described in claim 1 and wherein said heating and drawing operation is performed on a relatively large number of similar elongated fiber optical components each of which comprises a light-conducting core of glass of known refractive index surrounded by a pair of claddings of glasses of relatively lower refractive indices, the first cladding adjacent said core being of clear glass and the second cladding in surrounding relation therewith is formed of photosensitive glass.

References Cited

UNITED STATES PATENTS

| | | | |
|---|---|---|---|
| 2,515,937 | 7/1950 | Stookey | 65—30X |
| 2,651,145 | 9/1953 | Stookey | 65—30X |
| 2,971,853 | 2/1961 | Stookey | 65—30X |
| 3,253,497 | 5/1966 | Dreyer | 65—PhotosDIG |
| 3,313,940 | 4/1967 | Goodrich | 350—314 |
| 3,327,122 | 6/1967 | Dueker et al. | 65—LRDIG |
| 3,365,678 | 1/1968 | Maurer | 65—PhotosDIG |
| 3,397,023 | 8/1968 | Land | 65—LRDIG |
| 3,400,214 | 9/1968 | Hamann | 65—PhotosDIG |
| 3,445,666 | 5/1969 | Snaper | 65—LRDIG |
| 3,488,106 | 1/1970 | Lohmann | 65—LRDIG |

FRANK W. MIGA, Primary Examiner

U.S. Cl. X.R.

65—30, 33, 38, 61